Oct. 25, 1949.  W. E. BRILL  2,485,692
CONTROL VALVE

Filed Sept. 4, 1944  2 Sheets-Sheet 1

INVENTOR
William E. Brill
BY
Blackmore Spencer & Flint
ATTORNEYS

Oct. 25, 1949. W. E. BRILL 2,485,692
CONTROL VALVE
Filed Sept. 4, 1944 2 Sheets-Sheet 2

INVENTOR
William E. Brill
BY Blackmore, Smeeer & Ohio
ATTORNEYS

Patented Oct. 25, 1949

2,485,692

UNITED STATES PATENT OFFICE 2,485,692

CONTROL VALVE

William E. Brill, Cleveland, Ohio, assignor to General Motors Corporation, Detroit, Mich., a corporation of Delaware Application September 4, 1944, Serial No. 552,669

5 Claims. (Cl. 137—69)

1

The present invention generally relates to control valves and more particularly to improvements therein whereby the valve seats are easily replaced.

The principal object of the present invention is to provide a control valve which may be easily removed and installed in fluid tight relation within a cavity of a rotary member and provided with a readily replaceable resilient valve head on the valve stem which is operable by fluid pressure or by engagement of mechanical operating means.

Another object is to so form the resilient valve head so that it closely conforms to a suitably formed cooperating seat element to prevent wear and leakage therebetween.

The novel features of the invention by which the above objects are attained will become apparent by reference to the following detailed description and drawings illustrating two forms of valve assemblies for use interchangeably in a rotary sealing device for which these valve assemblies are particularly adapted.

Figure 1 of the drawings is a partial longitudinal cross sectional view of the rotary seal with parts broken away to show the mounting details for the valve assemblies.

Figure 1:
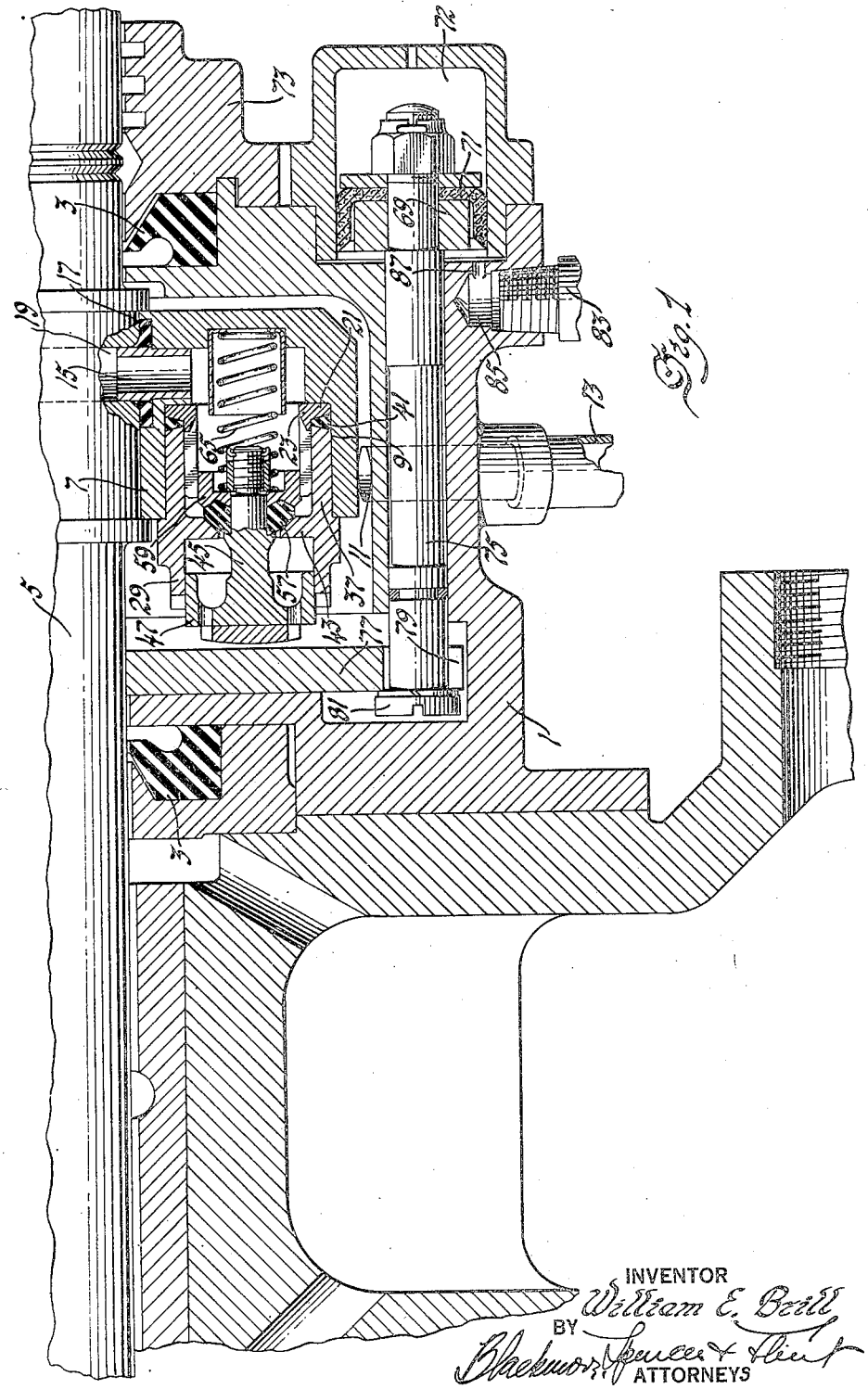

The rotary seal for which the valve assemblies were developed includes a split stationary seal housing 1 having suitable cavities including split synthetic rubber sealing members 3 shown engaging the periphery of a drive shaft 5 on which a split valve ring 7 is clamped for rotation by the shaft. The valve ring 7 is provided with circular valve cavities or openings 9 extending parallel to the drive shaft and part way through the ring. An opening 11 is provided in the stationary seal housing 1 to which a pipe 13 is connected through which pressure is applied to and released from the interior of the housing. Pressure passages 15 extend radially inwardly from each of the valve openings 9 and a counterbore is provided at the inner end of the passages 15 in which a resilient gasket 17 is located so that when the valve ring is clamped to the shaft 5 the radial openings 15 of the ring are connected in fluid tight aligned relation with radial shaft openings 19 which open into an axial shaft passage, not shown, for the application of fluid pressure to a fluid expansible clutch member, not shown, carried by the shaft to cause engagement of the clutch in a well known manner.

2

Figure 3:
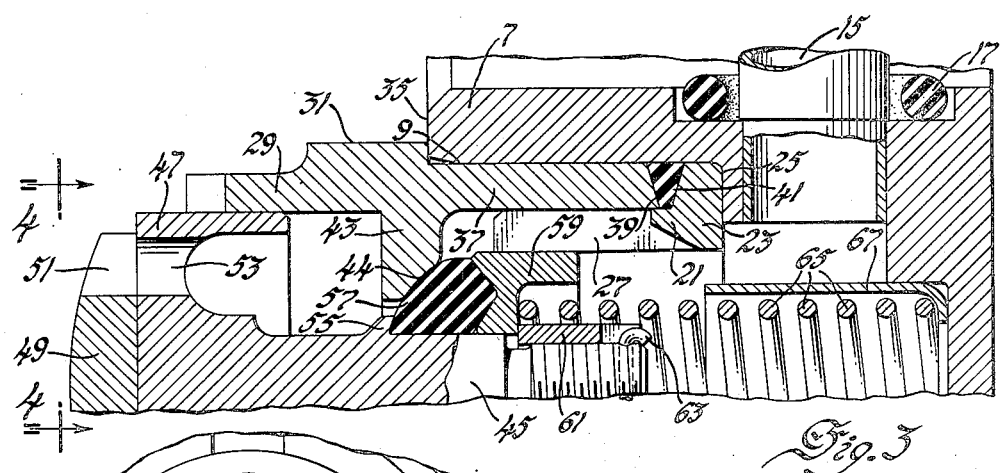
Figure 3 is an enlarged view similar to Figure 1 with parts broken away to show details of another form of valve assembly.
Figure 4:
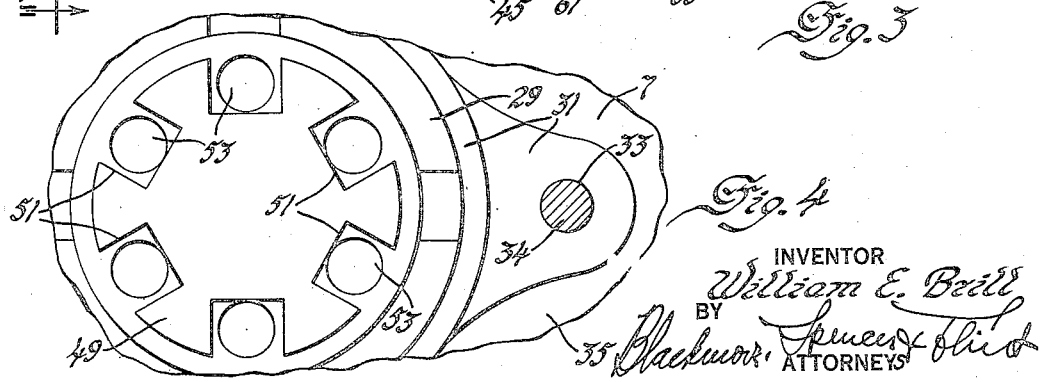
Figure 4 is a view taken on lines 4—4 of Figures 2 and 3.

The valve assembly shown in the openings 9 in the valve ring 7 in Figures 1 and 3 includes a sleeve 21 having an externally flanged inner end portion 23 of slightly less external diameter than the opening 9 and is shown in engagement with an internal shoulder 25 at the bottom of the opening 9 of the valve ring 7. The outer face of the flanged inner end portion of the sleeve 21 is inclined inwardly with respect to the opening 9 and an outer reduced diameter portion adjacent the flanged end is provided with slots 27 extending radially therethrough. A valve housing or cage 29 of hollow cylindrical form having at its outer end an external mounting flange 31 provided with suitable openings 33 therein, shown in Figure 4, through which studs 34 extend and are threaded into suitable openings in the valve ring in order to draw the inner face of the flange 31 into tight contact with the face 35 of the valve ring so that the inner portion 37 of the cage part extends into the opening 9 in the valve ring and over the outer slotted portion of the sleeve 21. The inner end face of the hollow cylindrical portion 37 of the cage part 29 is provided with an end face 39 which is inclined outwardly with respect to the opening 9 in the valve ring 7 and is axially spaced from the oppositely inclined face 27 of the sleeve 21. A resilient sealing gasket 41 is located in the space between the oppositely inclined faces 27 and 39 of the cage and sleeve so that the gasket is compressed therebetween when the cage 29 is drawn into contact with the face 35 of the valve ring 7 and is accordingly expanded outwardly into tight contact with the wall of the valve ring opening 9 to effectively prevent fluid leakage between this wall and the cage and sleeve. An internal flange 43 is provided on the cage 29 and is provided on its inner face with a tapered annular valve seat surface 44.

A valve stem 45 is provided with an enlarged diameter outer end portion 47 which is slidably mounted in the cage 29. The outer end portion 47 of the valve stem has a wear plate 49 secured to the outer end face. This wear plate is preferably made of sintered bronze and the outer end wear surface is slightly spherical in form. The periphery of the wear plate is provided with radial slots 51 which are aligned with holes 53 extending axially through the enlarged outer end portion 47 of the valve stem 45 and best seen in Figures 3 and 4. An external flange 55 is provided on the valve stem 45. The inner face of the flange 55 is concave and a resilient annular valve head 57, preferably of synthetic rubber and having an outer convex surface, is compressed between the inner concave surface of the valve stem flange 55 and the outer surface of a collar 59 held on the inner end of the valve stem by a castellated nut 61 threaded thereon and locked thereto by a key 63 extending through a diametral hole in the valve stem. The collar is slidably mounted in the slotted portion 27 of the sleeve 21. The outer face of the collar is shown provided with an annular groove of V form which is adapted to engage a surface of complementary form provided on the inner face of the resilient seat 57 in order to cause the resilient head to engage the periphery of the valve stem and concave surface of the flange 55.

The valve stem 45 is urged outwardly of the opening 9 in the valve ring 7 by a helical compression spring 65. The outer end of the spring is in contact with a counterbore in the collar 59 and the inner end is supported in a cup 67 supported in a recess at the bottom of the opening 9 in the valve ring so that the resilient valve head 57 on the valve stem is also compressed between the tapered seat 44 on the cage part 31 and the collar 59 and due to the convex outer surface of the resilient head 57 and the cooperating surfaces of the head and collar the resilient head is also caused to conform closely to these surfaces and also to the concave surface of the flange 55 and peripheral surface of the valve stem to effectively prevent leakage of fluid between all of these surfaces.

It will be evident that with the above described valve assembly and mounting thereof in the rotary valve ring 7 when pressure is applied to the pipe 13 fluid pressure will enter the seal housing 1 and be applied on the resilient valve stem head 57 through the slots 51 and holes 53 in the outer end of the stem 45 to cause unseating of the valve and allow pressure to pass through the slots 27 in the sleeve 21 and from the valve ring opening 7 through the radially extending holes 15 and 19 in the valve ring and drive shaft 5 and through the axial shaft hole, not shown, to the fluid pressure expansible clutch, not shown, to cause clutch engagement. When the pressure in the clutch is equal to that in the cavities of seal housing 1 the spring will cause reseating of the valve to prevent flow of pressure from the clutch and disengagement thereof and the valve assembly accordingly serves as a check valve to permit the venting of pressure from the interior of the housing 1 to prevent excessive wear on the sealing members 3 therein.

Pressure operated means are provided in the housing 1 for causing unseating of the valve to cause reverse flow of pressure through the valve from the clutch to cause disengagement thereof. The pressure operated means comprises a piston 69 provided with a flexible sealing cup 71 slidably mounted in a cavity 72 in an end cap 73 of the stationary seal housing 1, as best illustrated in Figure 1. A piston rod 75 is connected to the piston and is slidably mounted in an axial bore in the housing 1. A circular plate 77 is located in the seal housing 1 adjacent the enlarged end of the valve stems 45 and is normally biased by a suitable spring, not shown, out of contact therewith. The plate 77 is provided with peripheral slots 79 through which the inner end of the piston rod 75 extends and to which a screw having an enlarged diameter head 81 is threaded. The head 81 of this screw engages the plate 77 to cause movement of the plate into engagement with the spherical face of the wear plates 51 of the valve stems 55 to cause unseating of the valves upon the application of pressure to the piston 69 through a pipe connection 83 threaded in pressure openings 85 and 87 in the housing 1 behind the piston 69. It will be evident that the plate 77 engages the center of spherical portions of the valve stem wear plates 49 which revolve with the rotary valve ring 7 and accordingly there is no tendency for the valve stem to spin about its axis in the valve cage parts and therefore no rotary movement of the resilient valve stem head 57 relative to the head 44 of the cage part 29 occurs which prevents wear between these parts.

The form of valve assembly shown in Figure 2 differs from the form described above only in the following details and this form of valve assembly may be interchangeably mounted in the openings 9 in the valve ring 7 in the same manner as described above. This assembly includes a hollow cylindrical cage member 29' provided with circumferential sealing grooves in which resilient sealing rings 89 are located which engage the inner periphery of the valve ring opening 9 to effectively prevent leakage of fluid when the valve cage mounting flange 31 is drawn into engagement with the face 35 of the valve ring by studs in the same manner as with the other form of valve. The cage member 29' is provided with the same form of valve seat 44 and the valve stem assembly is the same as that previously described except for the collar 59' holding the resilient valve head 57 on the valve stem 45 in like manner. The collar 59' is provided with axially extending peripheral slots 91 for passage of fluid therebetween when the valve is unseated and the periphery of the collar 59' is slidably mounted in the inner end portion of the cage member 29'.

Figure 2:
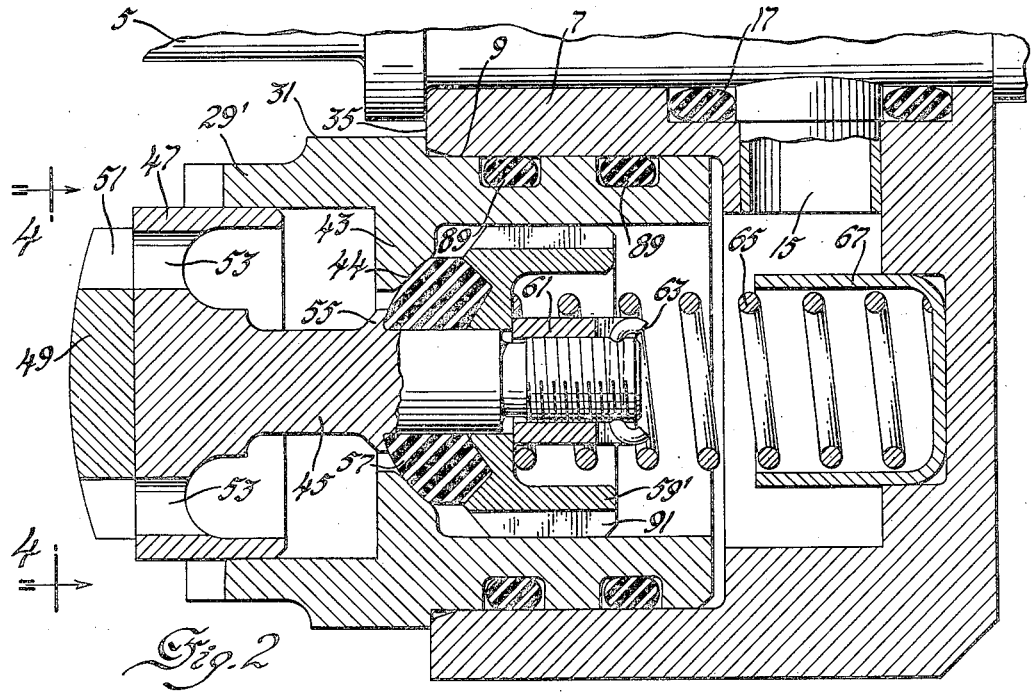
Figure 2 is an enlarged view similar to Figure 1 with parts broken away to show details of one form of valve assembly to better advantage.

The operation of the form of valve assembly shown in Figure 2 is similar to that previously described except for the passage of air through the slots 91 in the collar 59' in the valve shown in Figure 2 instead of passing through the slots 27 in the cage part 21 in the valve shown in Figures 1 and 3. The form of valve assembly shown in Figure 2 includes fewer parts with simpler sealing means between the cage part and valve ring.

I claim:

1. A valve mechanism comprising a rotatably supported drive shaft having a fluid passage, a stationary housing mounted in fluid sealing engagement with said shaft, said housing having a fluid opening and enclosing a member secured to said shaft and having a fluid opening communicating with said shaft passage and the interior of said housing, a valve cage having an internal valve seat of tapered annular form, said cage being mounted in fluid tight relation in the fluid opening of said member, a valve stem supported for axial movement in said cage, said stem having a spherical end projecting outwardly of said cage and a flange intermediate the ends thereof, a replaceable head of non-metallic, elastic, deformable material on said valve stem, a collar on the inner end of said stem having an annular V-shaped groove in the outer face adapted to engage a complementary surface provided on the inner face of said valve stem head which is provided with a convex surface on the outer face, means on said stem for maintaining said deformable head under compression between said stem flange and said collar to cause said deformable valve stem head to be normally held in fluid tight engagement with the periphery of said valve stem and the flange thereon, means in said member opening urging said collar outwardly thereof to also cause deformation and therefore fluid tight engagement of the convex surface of the valve stem head with the tapered seat of the valve cage and means movable axially with respect to said stem into engagement with a point on the outer spherical end of said stem located on the stem axis to move said deformable head inwardly off said cage seat.

2. A valve mechanism comprising a rotatably supported shaft having a fluid passage, a stationary fluid seal housing mounted in fluid sealing relation on said shaft, said housing having a fluid opening and enclosing a member secured on said shaft, said member being provided with a fluid opening communicating at one end with the shaft passage and the other end extending parallel with the axis of said shaft and communicating with the interior of said housing, a valve cage having an internal annular tapered valve seat mounted in fluid tight relation in the outer end of said member opening a valve stem slidably mounted in said cage having a flange intermediate the ends thereof, a replaceable oil resistant rubber valve head of annular form having a convex surface on the outer face adapted to engage the tapered seat of the cage and flange on said stem, a wear plate secured on the outer end of the valve stem and having an outer end surface of spherical shape, a collar on the inner end of said stem having an annular V-shaped groove in the outer face adapted to abut a complementary surface provided on the inner face of said valve head, means on the inner end of said valve stem for urging said collar into engagement with said valve head to cause the head to conform to the peripheral surface of the stem and the convex head surface to conform to the surface on the flange, resilient means for normally urging said collar outwardly of the cage member to cause the convex surface of the valve stem head to be deformably engaged with the tapered annular seat of said cage and to urge the outer spherical end surface of the valve stem wear plate outwardly of the cage and means axially movable toward and into contact with the outer spherical wear plate of the valve stem at a single point located on the axis of said stem whereby only axial inward movement of said head away from the seat on said cage occurs.

3. A valve mechanism comprising a rotatably supported shaft having a fluid passage, a stationary housing mounted in fluid sealing relation with said shaft, said housing having a fluid opening and enclosing a valve supporting member removably secured to said shaft, said valve supporting member having a fluid opening therein communicating with the interior of said housing extending parallel to the shaft axis and a passage leading from the opening communicating with the passage in said shaft, an axially movable valve operating plate adjacent said member, a valve cage having an internal annular seat removably mounted in the opening of said valve supporting member, a valve stem having an outer end supported for axial movement in said cage, a wear plate of sintered bronze on the outer end of the stem and provided with a spherical outer surface, a flange on said stem intermediate the ends thereof, a replaceable valve head of oil resistant rubber on said stem engageable with said flange, a collar engageable with the valve stem head, and means on the inner end of said stem to cause the surfaces of said valve head to conform to the surfaces on said stem and collar, said collar being slidably mounted on the inner end of said cage, and a spring in the opening of said valve supporting member for urging said valve head into contact with the seating surface on the cage to conform thereto and also for urging the outer spherical surface of the valve stem wear plate outwardly of the cage for sliding contact with the valve surface of the operating plate only at a point on the axis of the valve stem upon sufficient inward movement of the plate so that only axial inward movement of said head away from the seat of the cage occurs.

4. A valve mechanism comprising a rotatably supported drive shaft having a fluid passage therein, a stationary housing mounted in fluid sealing engagement on said shaft, said housing having a fluid opening and enclosing a valve supporting member secured on said shaft and having a valve cavity therein communicating with the interior of said housing and said shaft passage, a valve cage in the cavity having an internal valve seat, a valve stem slidable in the cage having an outer spherical end, an external flange, a resilient head and means on the valve stem for compressing said head to cause the resilient head to conform to the surfaces of the stem and, stem flange, spring means in said cavity for urging said stem outwardly thereof to cause said head to conform to said cage seat and also to cause the outer spherical end of the stem to project outwardly of the cavity, and a valve operating plate movable into non-rotating sliding contact with the outer spherical end of the valve stem only at a point on the axis thereof in order to cause only axial movement of the resilient valve stem head away from the seat of the valve cage.

5. A valve mechanism comprising a rotatably supported shaft having a fluid passage therein, a stationary split housing mounted in fluid sealing relation on said shaft and having a fluid opening and enclosing a split rotary valve supporting ring having cavities in one face thereof, each cavity communicating with the shaft passage and the interior of said housing including a valve cage supported in fluid tight relation therein and including a valve seat and, a valve stem slidable in each cage and provided with a spherical outer end portion and an external flange, a resilient head and a collar on the stem, means for compressing the resilient head between the flange and collar to prevent leakage of fluid thereby, and a spring for urging the collar outwardly of the cavity to cause the resilient head to conform to the cage seat, and valve operating means including a plate movable into axial point contact with the spherical outer ends of each of the valve stems to move the stems axially inwardly of the cages only in order to separate the valve stem heads from the cage seats and thereby prevent rotation and wear therebetween.

WILLIAM E. BRILL.

REFERENCES CITED

The following references are of record in the file of this patent:

UNITED STATES PATENTS

| Number | Name | Date |
| --- | --- | --- |
| 657,107 | Hannifin | Sept. 4, 1900 |
| 1,175,172 | Oakley | Mar. 14, 1916 |
| 1,274,680 | Calvert | Aug. 6, 1918 |
| 1,301,278 | Labus | Apr. 22, 1919 |
| 1,774,690 | Willoughby | Sept. 2, 1930 |
| 1,863,252 | Pierce | June 14, 1932 |
| 1,948,279 | Schidman | Feb. 20, 1934 |
| 2,011,547 | Campbell | Aug. 13, 1935 |
| 2,233,717 | Shogran | Mar. 4, 1941 |
| 2,310,309 | Orr | Feb. 9, 1943 |
| 2,401,061 | Fawick | May 28, 1946 |

Certificate of Correction

Patent No. 2,485,692

October 25, 1949

WILLIAM E. BRILL

It is hereby certified that errors appear in the printed specification of the above numbered patent requiring correction as follows:

Column 3, line 6, for "seat 57" read *head 57*; line 21, for the word "head", first occurrence, read *seat*; column 4, line 6, for "head 44" read *seat 44*; column 5, line 54, after "opening" insert *and*; column 6, line 38, after "housing" insert *and*; line 40, strike out "and" after "seat";

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*